R. C. MARTIN.
VEHICLE AXLE.
APPLICATION FILED JUNE 3, 1907.

911,142.

Patented Feb. 2, 1909.
2 SHEETS—SHEET 1.

Witnesses:

Inventor:
Roscoe C. Martin
By Hill & Hill
Attys.

R. C. MARTIN.
VEHICLE AXLE.
APPLICATION FILED JUNE 3, 1907.

911,142.

Patented Feb. 2, 1909.
2 SHEETS—SHEET 2.

Witnesses:
Inventor:
Roscoe C. Martin
By Hill & Hill
Attys.

UNITED STATES PATENT OFFICE.

ROSCOE C. MARTIN, OF CHAPMAN, NEBRASKA.

VEHICLE-AXLE.

No. 911,142.  Specification of Letters Patent.  Patented Feb. 2, 1909.

Application filed June 3, 1907. Serial No. 376,919.

*To all whom it may concern:*

Be it known that I, ROSCOE C. MARTIN, a citizen of the United States, residing at Chapman, county of Merrick, and State of Nebraska, have invented certain new and useful Improvements in Vehicle-Axles, of which the following is a description.

My invention relates to that portion of the vehicle known as the axle and in the present case is provided with means for adjusting the position of the wheels to guide the vehicle.

The object of my invention is to provide a device of the kind described of increased strength and durability and one whereby the lower, or bearing, points of the wheels are adjusted transversely of the vehicle to increase its stability while traveling on a curved course.

To this end my invention consists in the novel construction, arrangement, and combination, of parts herein shown and described and more particularly pointed out in the claim.

Figure 1:
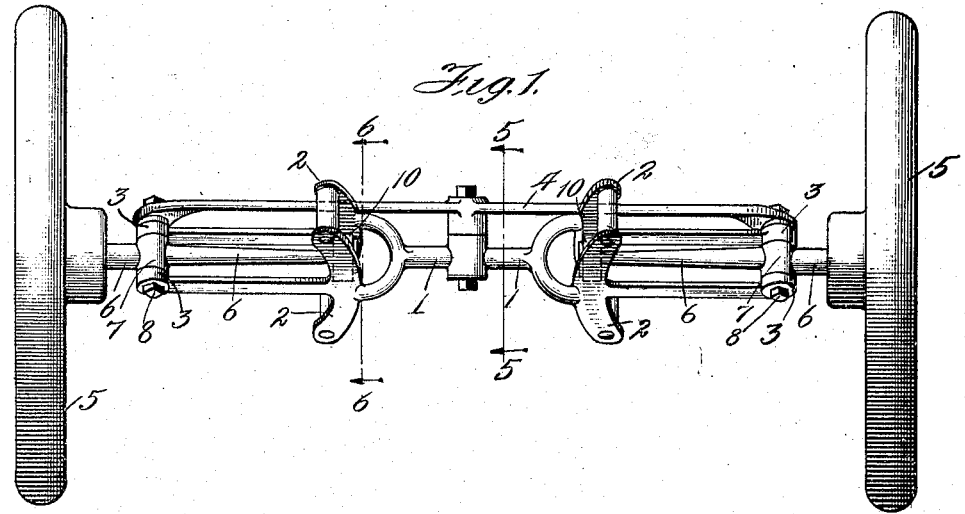
Figure 2:
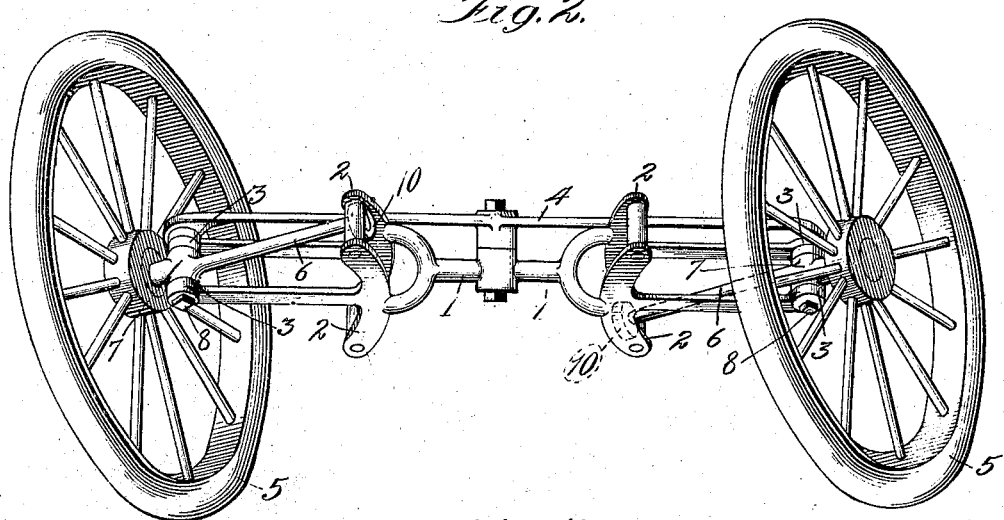
Figure 3:
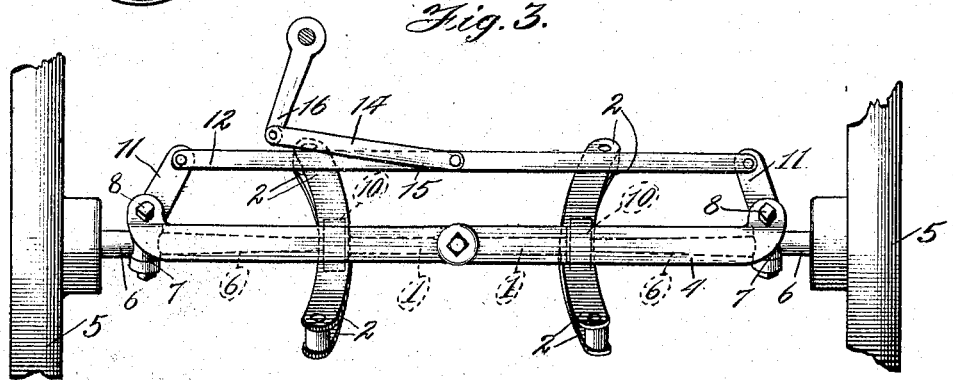
Figure 4:
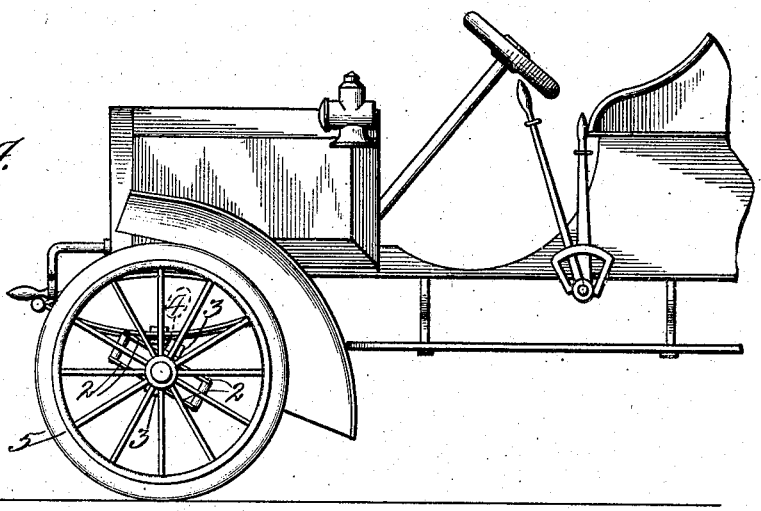
Figure 5:
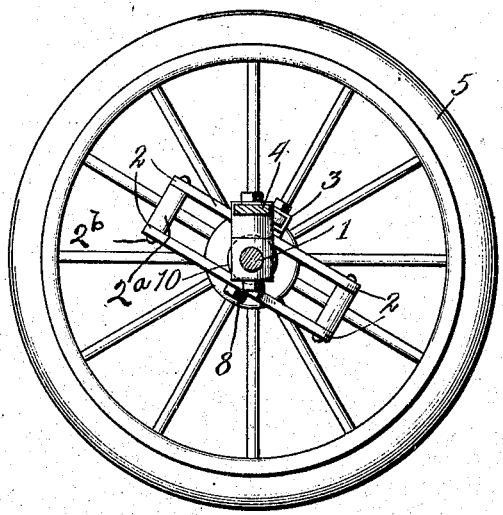
Figure 6:
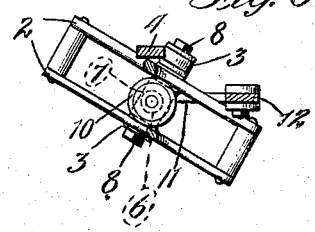
Figure 7:
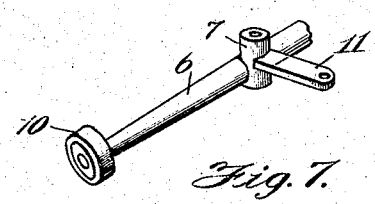

In the accompanying drawings wherein like or similar reference characters indicate like or corresponding parts, Figure 1 is a front elevation of my improvement with the parts positioned to travel in a straight course. Fig. 2 is a front elevation similar to that shown in Fig. 1 but with the parts positioned to travel in a curved course. Fig. 3 is a plan view of the device as shown in Fig. 1 with parts of the wheels broken away. Fig. 4 is an end elevation of my device and the associated parts of an automobile. Fig. 5 is a section taken substantially on line 5—5 of Fig. 1. Fig. 6 is a section taken substantially on line 6—6 of Fig. 1, and Fig. 7 is a detail showing a part of one of the movable end portions of my device.

In the preferred form shown in the drawings, my device consists of three principal parts, comprising a main, or central, stationary part adapted to be rigidly attached to the vehicle body, and two movable parts each attached to the end of the stationary part and having a projecting bearing adapted to snugly fit the central bore of a wheel to rotatably attach the same to the stationary part and thereby to the vehicle body.

The stationary part may be of any suitable form or construction adapted for use with the particular form of vehicle for which it is intended. In the form shown this part comprises a bar 1 forked at each end, the upper and lower members of the forked portion being substantially duplicates and each provided with a transverse curved portion 2, and an eye 3 near its extremity. The upper and lower portions of the forked parts are substantially parallel thus forming a guideway between the curved portions 2 and a pair of suitable bearings at each extremity of the stationary part for attaching the movable portion of the axle. As shown also, a bar 4 is provided substantially parallel to the bar 1 the two being rigidly connected near their common center, and also at each extremity. The bar 4 is adapted for direct attachment to the vehicle body and serves as an intermediate member between the vehicle body and the bar 1.

The movable parts may be of any desired form or construction to coöperate with the stationary part of the axle, each serving as a longitudinal extension at the extremity of the axle for attaching the wheels 5—5 thereto. In the form shown each movable part consists of an arm 6 provided at a point intermediate its ends with a socket 7 adapted to receive a suitable bolt or pin 8, or other suitable means for providing a pair of transverse projections adapted to coöperate with the eyes 3—3 to form a pivotal connection between the stationary and movable parts of the axle. The portions at each end of the bolt 8 projecting beyond the socket 7 are preferably reduced in diameter and fitted with suitable nuts or equivalent means for drawing the eyes 3—3 down upon the shoulders at the ends of the part within the socket 7 to rigidly clamp the bolt 8 in position and also to rigidly connect the extremities of the forked part of the bar 1 leaving the arm 6 free to turn upon the body of the bolt.

One end of the arm 6 is preferably formed in the usual or any desired manner to coöperate with the wheel 5 and rotatably secure the same in position. Its opposite extremity extends to the space between the curved parts 2 where a roller 10 or other suitable means is provided for coöperating with the proximate faces of the guideway to form an additional bearing between the stationary part and each movable part to support the pivotal connection and prevent undue strain upon the bolt 8.

Any suitable means may be provided for inclining the wheels to correspond with the angular relation between the movable and the stationary parts so that when the wheels are positioned to follow a curved course, they will be in the most advantageous position to resist the centrifugal tendency of the parts of the vehicle. In the form shown, the axis of the pivotal connection between the movable and stationary parts is inclined upwardly and rearwardly. The guideway between the parts 2—2 being positioned at a corresponding angle so that the vertical position of the free end of the movable part will be altered for each change in its horizontal position, that is, when the center lines of the movable part and a stationary part coincide or are substantially parallel, the projecting part upon which the wheel is mounted will be substantially level. When extending forward from its pivotal connection, its outer end will be elevated to correspond with its angular position, and when extending rearwardly its outer or free end will be depressed. The wheel mounted upon said part obviously being correspondingly inclined as shown in Fig. 2. In the form shown also, each arm 6 is provided with a transverse projection 11 for controlling its position, the two parts 11 being preferably connected as shown by a bar 12 pivotally attached to each so that the position of the two movable parts will, at all times, correspond, that is, if the free end of one is moved forward and upward, the free end of the arm 6 upon the opposite end of the axle will be moved rearward and downward, the parts being arranged to maintain the movable parts in substantially parallel planes both vertically and horizontally.

The usual or any preferred means may be provided for controlling the movement of the bar 12 to adjust the position of the wheels. As shown, a rod 14 is pivotally attached at one end to the bar 12 as at 15 and at its opposite end is pivotally attached to an arm 16 upon a steering mechanism or other suitable means for the purpose whereby the operator of the vehicle may readily control the angular position of the movable parts and the wheels.

Thimbles $2^a$ extend between the members 2 at the outer ends thereof and aid in spacing said members apart. Rivets or other fastening devices $2^b$ serve to retain these thimbles in position.

In the accompanying drawings and in this specification, only the preferred form of my device is shown and described but it is obvious that various immaterial modifications may be made in my improvement to adapt the same to the various forms of vehicles, hence, I do not wish to be understood as limiting myself to the exact form and construction shown.

What I claim as new and desire to secure by Letters Patent is,

In a device of the character described, the combination with a transversely extending bar 4, of a centrally disposed member supported from said bar, said centrally disposed member having its opposite ends bifurcated, curved, inclined guide plates 2 in which said bifurcated ends terminate, said guide plates being spaced from each other to form guide ways, thimbles $2^a$ closing the outer ends of said guide ways, arms projecting outwardly from said guide plates, inclined pivots passing through the outer ends of said arms and through the bar 4, movable members mounted upon said pivots each of said members comprising an outwardly projecting wheel receiving portion, a bearing sleeve, an inwardly projecting portion, and a rearwardly projecting portion, anti-friction rollers mounted upon the inner ends of said inwardly projecting portions, said rollers traveling between the guide plates, and a transversely disposed member 12, connecting the rearwardly projecting portions of the movable members.

In testimony whereof I have hereunto signed my name in the presence of two subscribing witnesses.

ROSCOE C. MARTIN.

Witnesses:
CARL O. WILLARD,
R. HANAN.